UNITED STATES PATENT OFFICE.

JOSEPH WILLIAMS, OF SHARPSBURG, PENNSYLVANIA.

IMPROVEMENT IN LUBRICATING COMPOUNDS.

Specification forming part of Letters Patent No. 156,719, dated November 10, 1874; application filed October 24, 1874.

*To all whom it may concern:*

Be it known that I, JOSEPH WILLIAMS, of Sharpsburg, in the county of Allegheny and State of Pennsylvania, have invented a new and useful Improvement in Lubricating Compound; and I do hereby declare that the following is a full and exact description thereof.

The nature of my invention consists in a lubricating compound composed of tallow or other grease, plumbago, flowers of sulphur, resin, and lime-water in about the proportions hereinafter specified, and mixed together so as to form a homogeneous mass.

To enable others skilled in the art to make my compound, I will proceed to describe more fully the mode of preparing it.

I take thirty-five parts of tallow or other grease and melt it. To this melted grease I add twenty-five parts of plumbago, (black lead,) fifteen parts of flowers of sulphur, twenty parts of lime-water, and fifteen parts of resin. All of these ingredients above named, in about the proportions specified, are brought to a suitable temperature—say, about 250°—care being taken to keep stirring the ingredients as they are severally added to the melted grease. After they have been thoroughly heated and mixed, the compound is removed from the fire, and the stirring continued until the mass is sufficiently cool to congeal. It is then put up in suitable vessels for sale. The lubricating compound hereinbefore described will be found useful for all things requiring lubrication, and will be found free from grit, and very durable and cheap.

Having thus described my improvement, what I claim as of my invention, is—

A lubricating compound, consisting of tallow or other grease, plumbago, flowers of sulphur, resin, and lime-water, prepared in the manner and about the proportions specified.

JOSEPH WILLIAMS.

Witnesses:
  A. C. JOHNSTON,
  JAMES J. JOHNSTON.